United States Patent [19]

Engels

[11] Patent Number: 4,918,792
[45] Date of Patent: Apr. 24, 1990

[54] DEVICE FOR ATTACHING A LICENSE PLATE TO AN AUTOMOBILE

[76] Inventor: Edward E. Engels, 50 Chapin Greene Dr., Ludlow, Mass. 01056

[21] Appl. No.: 254,614

[22] Filed: Oct. 7, 1988

Related U.S. Application Data

[63] Continuation-in-part of Ser. No. 105,865, Oct. 8, 1987, abandoned.

[51] Int. Cl.$^5$ ............................................. A44B 15/00
[52] U.S. Cl. ........................................ 24/300; 40/202; 248/316.1; 248/316.2
[58] Field of Search ................ 24/300, 301, 298, 453, 24/344; 40/200, 201, 202; 248/231.3, 316.1, 316.2

[56] References Cited

U.S. PATENT DOCUMENTS 2,062,057  11/1936  Hobby .
2,110,515   3/1938  Weaver ........................... 40/200
2,157,806   5/1939  Tilton ........................... 24/300 X
2,637,240   5/1953  McClellan .
2,654,933  10/1953  Hecht .
3,196,508   7/1965  Carter ........................... 24/300

Primary Examiner—Laurie K. Cranmer
Attorney, Agent, or Firm—Norman B. Rainer

[57] ABSTRACT

A device is provided for the quick and reversible attachment of a license plate to the mounting frame of an automobile vehicle. The device, which can be utilized without tools, is comprised of two anchoring components interengaged by a coil spring. Each anchoring component has a straight post adapted to penetrate the aligned holes in a license plate and a mounting frame. In use, the posts are inserted into the aligned holes while tensioning the spring. When the tension is released, the posts become angled within the holes, thereby securing the license plate.

6 Claims, 1 Drawing Sheet

DEVICE FOR ATTACHING A LICENSE PLATE TO AN AUTOMOBILE

RELATED APPLICATIONS

This application is a continuation-in-part of U.S. patent application Ser. No. 105,865 filed 10/08/87 now abandoned.

BACKGROUND OF THE INVENTION

This invention relates to a fastening device, and more particularly concerns a device for quickly and releasably attaching automobile license plates to the frames or other mounting means provided for them.

Automobile dealers are often required to temporarily affix license plates to automotive vehicles. It is desirable to be able to affix and remove license plates quickly without the need for tools, and in a manner which will not mar any surface of the vehicle.

Devices for achieving such objectives have been disclosed heretofore in U.S. Pat. Nos. 2,637,240; 2,654,933; 2,062,057; and elsewhere.

In general, such devices involve penetrating members adapted to be inserted through the two standard apertures adjacent the upper edge of the license plate. The penetrating members further engage conventionally located apertures in a standard frame or holder attached to the vehicle. The penetrating members of some earlier devices are of bolt-like design, two such members being utilized without any interaction therebetween. A problem encountered with such devices is that, if the bolt-like member is easily inserted, it probably will easily dislodge inadvertently to cause loss of the license plate. In order to achieve greater holding power, tighter fit is generally required, with attendant need for tools for insertion or removal.

The penetrating members of some earlier devices are interactive components of a single unit. For example, the device of U.S. Pat. No. 2,637,240 is comprised of an integral elongated piece of rubber fashioned to have penetrative portions at its extremities. The restoring force of the rubber imparts a canting or tilting force to the penetrating portions to secure the license plate. Although such principal of operation is sound, improvements are desirable in the durability of the device, especially with respect to long-term outdoor weathering factors. Improved ease of use is also desirable, particularly with respect to inserting and removing the penetrative members.

It is accordingly an object of the present invention to provide a device for easily attaching a license plate to holding means on an automotive vehicle.

It is another object of this invention to provide a device as in the foregoing object which securely attaches said license plate without the need for tools.

It is a further object of the present invention to provide a device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a fastening device intended to engage the holes of a license plate comprised of paired identical anchoring means interconnected by a coil spring, said anchoring means being of monolithic structure and comprised of:

(a) an abutment base having a flat first surface and an opposite second surface, first and second extremities, and a fulcrum shoulder disposed upon said first surface at said first extremity, (b) a straight penetrating post perpendicularly emergent from said first surface adjacent said first extremity, said post having a series of conical serrations, each serration having a top extremity, and a bottom extremity of larger diameter than said top extremity, said bottom extremities being directed toward said first surface, (c) an offset leg emergent from said second surface at a site opposite said post, and (d) a connecting arm emergent from said offset leg in a direction away from said abutment base and centered upon a plane substantially parallel to said abutment base, said connecting arm terminating in a distal extremity having an aperture, said anchoring means being interconnected by way of said apertures to the extremities of said coil spring whose length is such that the spring is under tension when the penetrating posts are inserted into the holes of the license plate.

In operation, the posts are inserted through the holes in the license plate and corresponding holes in the license plate holder. A lock washer may be inserted onto each post following their emplacement. As initially inserted, the first surface of the abutment base lies flush against the license plate. Once the inserting force is removed, the tension of the coil spring causes each anchoring means to tilt in a horizontal path about the fulcrum shoulder, which is preferably rounded. Such tilting action causes the post to have an angled or canted disposition relative to the holes in the license plate and license plate holder. By virtue of such canted disposition, one side of the post bears against the license plate holder, and the opposite side of the post bears against the license plate in the opposite direction, thereby forcing together the license plate and holder.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
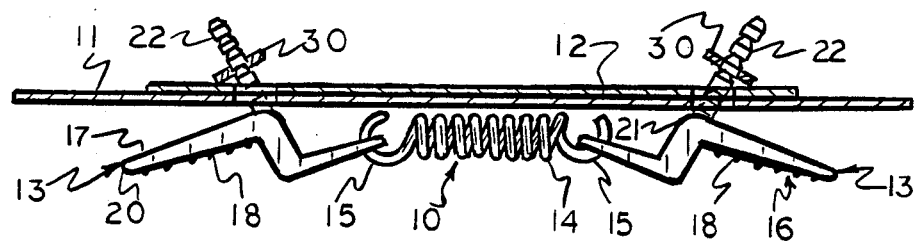
FIG. 1 is a top view of an embodiment of the device of the present invention shown in functional engagement with a license plate and holder therefor.
Figure 2:
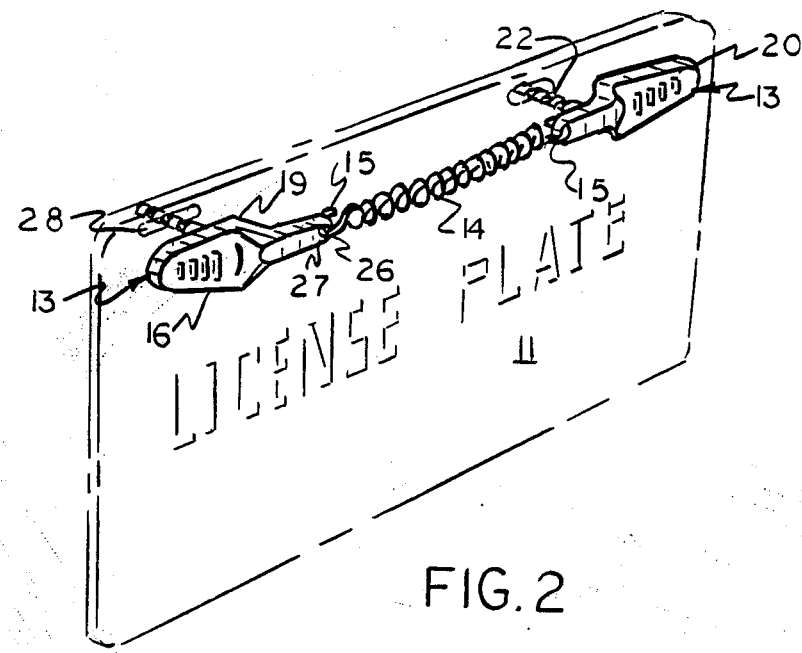
FIG. 2 is a perspective view of the device of FIG. 1.
Figure 3:
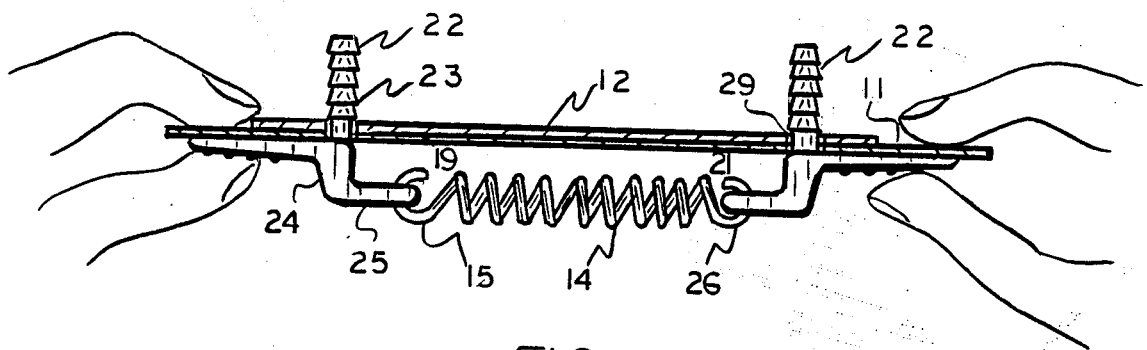
FIG. 3 is a top view as in FIG. 1 showing the configuration of the device during its emplacement upon and removal from a license plate.

Referring to FIGS. 1–3, an embodiment of the device 10 of the present invention is shown in functional relationship with a license plate 11 and a holder 12 for the license plate, said holder being affixed to the automotive vehicle.

The device 10 is comprised of paired identical anchoring means 13 of monolithic structure fabricated of metal or plastic by a molding or casting operation. The anchoring means are interconnected by coil spring 14 having hooked extremities 15.

Each anchoring means is comprised of an abutment base 16 having a flat first surface 17 adapted to fit flush against the license plate, and an opposite second surface 18. Base 16 is further bounded by first and second extremities, 19 and 20, respectively, which define the length of base 16. A rounded fulcrum shoulder 21 is disposed upon said first surface at said first extremity.

A straight penetrating post 22 is perpendicularly emergent from said first surface adjacent said first extremity. The post has a series of conically-shaped annular serrations or protrusions 23. Each serration has a top extremity, and a bottom extremity of larger diameter than said top extremity. The bottom extremities are directed toward said first surface.

An offset leg 24 is emergent from said second surface at a site opposite said post. The length of leg 24 is shorter than the length of base 16.

A connecting arm 25 emerges from leg 24 in a direction away from abutment base 16, and is centered upon a plane substantially parallel to said base. The connecting arm terminates in a distal extremity 26 having an aperture 27 adapted to receive a hooked extremity of spring 14.

As shown in FIG. 3, the device is employed by applying finger pressure to each anchoring means so that post 22 penetrates the holes 28 and 29 in the license plate and holder, respectively. During said pressing action, the first surface of the abutment base fits flush against the license plate, and in such configuration the spring is stretched.

When the pressing force is removed, the spring contracts and causes tilting of the anchoring means, as shown in FIG. 1. Accessory lock washers 30 may optionally be applied to the posts for greater assurance of the sought holding effect. In the tilted position, fulcrum shoulder 21 presses against the license plate, and the angled position of the post causes it to engage both the license plate and holder, forcing both into tight engagement. Because both anchoring means act in equal and opposite directions, lateral forces generated by the angling of the post are cancelled out. The serrations 23 present slipping along the post. It is to be further noted that, in the illustrated embodiment, the spring is adapted to rest in contact with the license plate in the holding state of the device. Second surface 18 may be roughened or provided with a series of low protrusions to facilitate finger manipulation.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A fastening device intended to engage holes of a conventional license plate comprised of paired identical anchoring means interconnected by a coil spring, said anchoring means being comprised of:
    (a) an abutment base having a flat first surface and an opposite second surface, first and second extremities, and a fulcrum shoulder disposed upon said first surface at said first extremity,
    (b) a straight penetrating post perpendicularly emergent from said first surface adjacent said first extremity, said post having a series of conical serrations, each serration having a top extremity, and a bottom extremity of larger diameter than said top extremity, said bottom extremities being directed toward said first surface,
    (c) an offset leg emergent from said second surface at a site opposite said post, and
    (d) a connecting arm emergent from said offset leg in a direction away from said abutment base and centered upon a plane substantially parallel to said abutment base, said connecting arm terminating in a distal extremity having an aperture,
said anchoring means being interconnected by way of said apertures to the extremities of said coil spring whose length is such that the spring is under tension when the penetrating posts are inserted into the holes of the license plate.

2. The device of claim 1 wherein said fulcrum shoulder is rounded.

3. The device of claim 1 wherein the length of said offset leg is shorter than the length of said abutment base.

4. The device of claim 1 wherein said second surface is roughened to facilitate finger manipulation.

5. The device of claim 1 further including retaining washers configured to be disposed upon each penetrating post.

6. The device of claim 1 wherein said anchoring means are of monolithic structure.

* * * * *